United States Patent
Ta et al.

(10) Patent No.: US 11,138,634 B2
(45) Date of Patent: Oct. 5, 2021

(54) GIG VEHICLE PARKING

(71) Applicant: Productive Application Solutions, Inc., Sheridan, WY (US)

(72) Inventors: Peter Ta, Tucson, AZ (US); Gerald Maliszewski, San Diego, CA (US)

(73) Assignee: Productive Application Solutions, Inc., Sheridan, WY (US)

(*) Notice: Subject to any disclaimer, the term of this patent is extended or adjusted under 35 U.S.C. 154(b) by 0 days.

(21) Appl. No.: 17/313,271

(22) Filed: May 6, 2021

(65) Prior Publication Data

US 2021/0256560 A1    Aug. 19, 2021

Related U.S. Application Data

(63) Continuation of application No. 17/071,043, filed on Oct. 15, 2020, now Pat. No. 11,037,199, which is a
(Continued)

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC ........... G06Q 30/0244; G06Q 30/0252; G06Q 30/0267
(Continued)

(56) References Cited

U.S. PATENT DOCUMENTS 8,368,562 B2    2/2013  Horstemeyer
9,076,336 B2 *  7/2015  Tippelhofer ........... G08G 1/148
(Continued)

FOREIGN PATENT DOCUMENTS

DE    102016206149       10/2017
FR         2578996 A1 *   9/1986  ............. G09F 21/04
(Continued)

OTHER PUBLICATIONS

* Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

A gig parking system is provided with a mobile platform having a secure access mechanism permitting a trusted parking agent to gain control over the platform. The platform may include a location subsystem to determine the geographic location of the platform and a communications subsystem to transmit verification information including an identification code associated with the parking agent, an identification code associated with the vehicle, and geographic location. A parking software application may permit the selection the destination parking location from a plurality of potential destination parking locations, which may have weighted values with a corresponding reward, and which may be given to either, or both, the platform owner and the parking agent. The reward may be based upon additional factors, such as vehicle starting parking location, distance between starting and destination parking locations, (Continued)

travel time between starting and destination parking locations, time of day, and day of the week.

26 Claims, 8 Drawing Sheets

Related U.S. Application Data continuation-in-part of application No. 17/023,546, filed on Sep. 17, 2020, now Pat. No. 10,991,007, which is a continuation-in-part of application No. 17/007,575, filed on Aug. 31, 2020, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | |
|---|---|---|---|
| 9,718,397 B2 | 8/2017 | Kalanick et al. | |
| 9,821,768 B2 | 11/2017 | Oz et al. | |
| 9,823,081 B2 | 11/2017 | Crawford et al. | |
| 9,953,283 B2 | 4/2018 | Sweeney et al. | |
| 10,308,244 B2 | 6/2019 | Penilla et al. | |
| 10,614,410 B2 | 4/2020 | Gillen et al. | |
| 2002/0009978 A1* | 1/2002 | Dukach | G08G 1/01 455/99 |
| 2011/0131235 A1* | 6/2011 | Petrou | G06F 16/532 707/769 |
| 2012/0245966 A1* | 9/2012 | Volz | G06Q 10/02 705/5 |
| 2013/0307706 A1* | 11/2013 | Kriezman | B60Q 1/503 340/988 |
| 2014/0214319 A1* | 7/2014 | Vucetic | G01C 21/3446 701/533 |
| 2015/0123818 A1* | 5/2015 | Sellschopp | G08G 1/096816 340/932.2 |
| 2015/0149265 A1 | 5/2015 | Huntzicker et al. | |
| 2015/0254721 A1* | 9/2015 | Rad | G06Q 30/0266 705/14.63 |
| 2015/0279210 A1* | 10/2015 | Zafiroglu | G08G 1/065 340/932.2 |
| 2016/0116293 A1* | 4/2016 | Grover | G01C 21/34 701/23 |
| 2017/0025008 A1 | 1/2017 | Gignac et al. | |
| 2017/0293950 A1 | 10/2017 | Rathod | |
| 2017/0309170 A1* | 10/2017 | Wang | G08G 1/146 |
| 2018/0094953 A1 | 4/2018 | Colson et al. | |
| 2018/0144622 A1 | 5/2018 | Gage et al. | |
| 2018/0186309 A1* | 7/2018 | Batten | B60Q 1/56 |
| 2018/0186311 A1* | 7/2018 | Mason | B60R 21/01 |

FOREIGN PATENT DOCUMENTS

| | | | | |
|---|---|---|---|---|
| GB | 2402254 A | * | 12/2004 | .......... G06Q 20/127 |
| JP | 2010026474 A | * | 2/2010 | .......... G09F 21/048 |
| JP | 2018072077 A | * | 5/2018 | ............. G01S 19/14 |
| JP | 2018205399 A | * | 12/2018 | |
| WO | WO-2008135617 A1 | * | 11/2008 | .......... G08G 1/0175 |

OTHER PUBLICATIONS

• Ted Morris et al. A Comprehensive System for Assessing Truck Parking Availability Final Report. (Jan. 2017). Retrieved online Aug. 26, 2020. https://www.dot.state.mn.US/ofrw/PDF/assessing-truck-parking.pdf (Year: 2017).*
• Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*
Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*
Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*
Technoframe. LED Bus Screens. (Nov. 18, 2011). Retrieved online Aug. 13, 2020. https://technoframe.com/led-bus-screens (Year: 2011).*

* cited by examiner

GIG VEHICLE PARKING

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to vehicle position monitoring networks, more particularly, to a system and method for monitoring and controlling vehicle parking positions.

2. Description of the Related Art

Automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, describes an automotive targeted parking system that adds to an automobile the additional feature of a media display subsystem, and which may also include a Wireless Local Area Network (WLAN) IEEE 802.11 (WiFi) access point (hotspot).

It would be advantageous if an automobile could be used as portable real estate, capable of projecting media and acting as a communications center.

It would be advantageous if a system existed for moving vehicles to prime parking locations so as to enable the concept of portable real estate.

It would be advantageous if the parking locations to which the vehicles are moved could be monitored.

It would be advantageous if a Domain Name System (DNS) service associated with the vehicle could track the Uniform Resource Locator (URL) addresses requested through an embedded publically accessible WLAN or Wireless Personal Area Network (WPAN).

It would be advantageous if the time and location of the WLAN or WPAN services could be tracked, recorded, and continuously verified.

SUMMARY OF THE INVENTION

A system and method are disclosed herein for automotive vehicle positioning, for use in providing Wireless Local Area Network (WLAN) IEEE 802.11 (WiFi) access point and media projection services. Thus, the system may act as a mobile advertising platform that seeks to expand and capture market share within the outdoor advertising market segment by directing the selective deployment of media and WLAN services to preferred target locations. The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN access point is in use. Further, if the WLAN access point is in use, the system relays Uniform Resource Locator (URL) address requests from proximate users, and returns the request results. Graphic information system (GIS) mapping technology may be used to compensate a person or business entity associated with the system for operating in specified locations. One of the primary features of the system its ability to determine if a vehicle is temporarily at rest or parked in a stationary location. Also provided is a system that permits the vehicles to be moved to desired locations using a network of trusted parking agents.

Accordingly, a mobile communications system is provided that includes a location subsystem, configured for attachment to a mobile platform, to determine the stationary geographic location of the platform. Some examples of a location subsystem might be a Global Positioning Satellite (GPS) receiver or cell-site multilateration. A deployment subsystem, configured for attachment to the platform, has an interface to supply an enablement signal with an identification code, in response to determining that the platform is parked in a stationary location.

The system also includes a communications subsystem, configured for attachment to the platform, having an interface to receive verification information including the enablement signal, identification code, and the stationary geographic location. The communications subsystem has an interface to transmit the verification information. For example, the verification information may be transmitted to a central server via a cellular network. In one aspect a media projection subsystem is configured for attachment to the mobile platform, with an interface to project media. In one variation the media projection subsystem is configured for media projection only when the platform is parked in a stationary location. One example of the media projection subsystem is a roof-mounted screen that is unfurled over the side of an automobile. In the case of an electronic media display, the media to be projected may be uploaded from a central server. In another version, the system includes a motion detector to determine when the mobile platform (e.g., an automotive vehicle) is being operated but temporarily at rest, for example stopped at a red light traffic light, and the deployment subsystem supplies the enablement signal verifying the lack of motion. However, it should be understood that an enablement signal supplied in response to a lack of motion (a stationary location) may also applied to display types other than the above-mentioned screen. In this case, the media projection subsystem may be aerodynamic for use in a moving vehicle.

In one aspect, the system also includes a publically accessible WiFi hotspot configured for attachment to the mobile platform. In another aspect, the system includes a targeting software application that permits the selection of the stationary position from a plurality of potential stationary positions, which may have weighted values, and with corresponding rewards for their selection. The targeting application may be embedded with either the server or the platform.

The system may further include a camera, configured for attachment to the platform, having an output to supply images of a proximate geographic location to the platform, which the communications subsystem transmits to the server or stores in local memory. If a camera is enabled, the system may use a facial recognition software application to compare the received camera images to facial data, and cross-reference recognized facial data to associated publically available social network data. In addition, media may be selected in response to the social network data and transmitted to the platform communications subsystem for presentation by the media projection subsystem.

A gig parking system is also provided with a mobile platform having a secure access mechanism configured for attachment to the platform. The secure access mechanism permits a trusted parking agent to gain control over the platform. Simple examples of secure access mechanisms include a lock-and-key or an electronically entered code that permits the platform to be unlocked. In the case of an automotive vehicle, the secure access mechanism permits the vehicle to be opened (unlocked), started, driven, and parked. The parking agent may be a human being or an autonomous self-driving embedded in the platform. As above, the platform includes a location subsystem to determine the geographic location of the platform. A communications subsystem receives verification information including an identification code associated with the parking agent, an identification code associated with the platform, and geographic location, and has an interface to transmit the verification information. A parking mechanism, which may be enabled as a software application, accepts the parking agent's destination parking location, and in some aspects permits the selection of the destination parking location from a plurality of potential destination parking locations. As above, each potential destination parking location may have a weighted value with a corresponding reward, which may be given to either, or both, the platform owner and the parking agent.

The parking software application typically has a parking agent interface that supplies a list of potential platforms with corresponding starting parking locations. The reward for the parking agent may be based upon additional factors, such as platform starting parking location, distance between starting and destination parking locations, timing restraints, travel time between starting and destination parking locations, time of day, day of the week, and combinations thereof. Likewise, the platform owner may also receive rewards based on these additional factors.

The system may further include a publically accessible WiFi hotspot configured for attachment to the platform, or a selectively enabled media projection subsystem, configured for attachment to the platform. In this case the deployment system may receive an enablement signal in response to the media projection subsystem or hotspot being enabled, and the communications subsystem transmits the enablement signal.

Additional details of the above-described systems and associated methods of implementation are provided below.

DETAILED DESCRIPTION

Figure 1A:
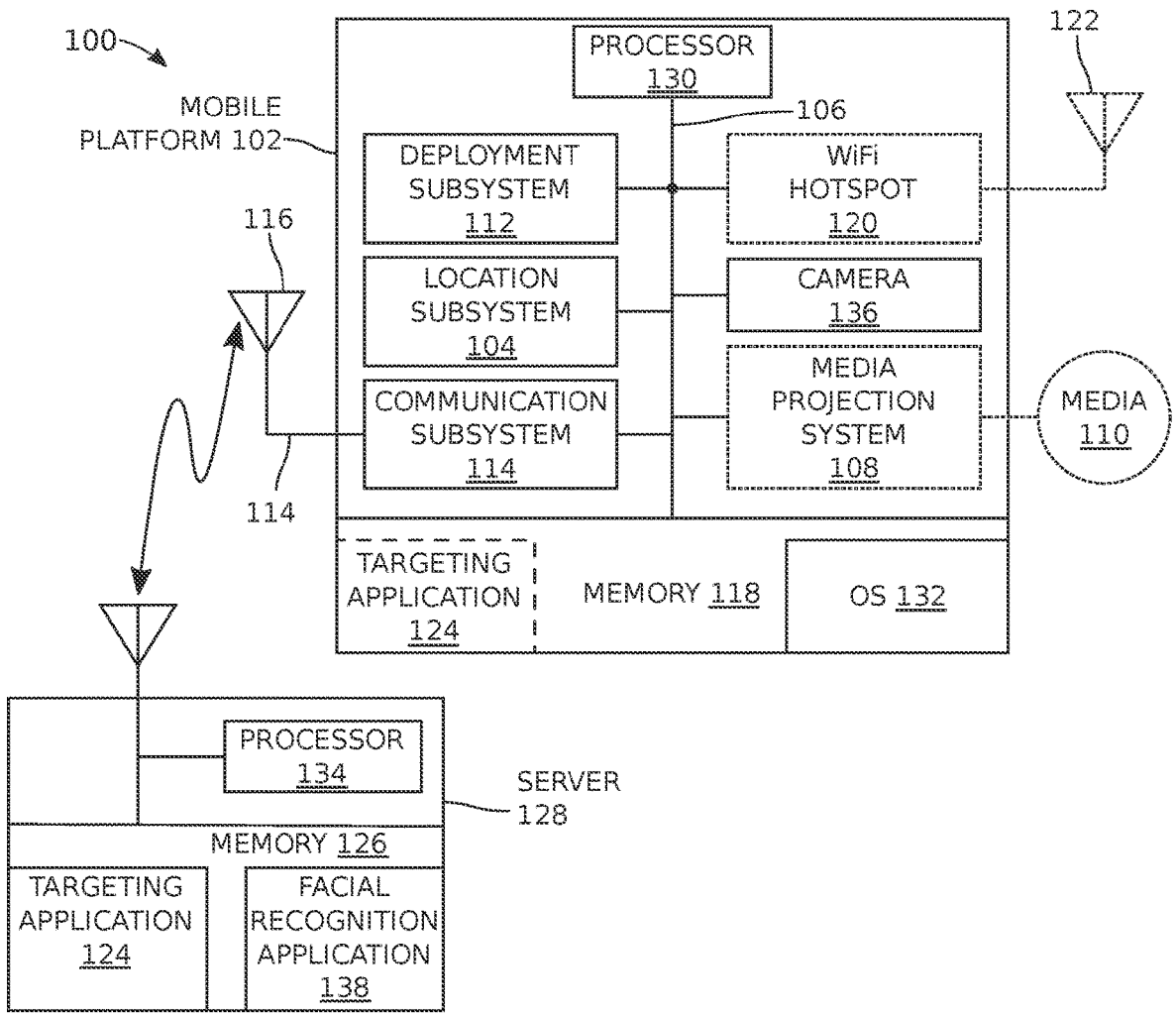
FIGS. 1A through 1D are diagrams of a mobile location system.

FIGS. 1A through 1D are diagrams of a mobile location system. In FIG. 1A, the system 100 comprises a location subsystem 104, configured for attachment to a mobile platform 102, to determine the geographic location of the platform. In one aspect, the location subsystem 104 determines a stationary geographic location. The location subsystem 106 supplies the determined location on bus line 106. Some common examples of a mobile platform include an automotive vehicle, scooter, truck, a towed trailer, or portable objects that a small enough to be moved without wheels, (e.g., a sidewalk sign). Examples of a location subsystem 104 include a Global Positioning Satellite (GPS) system receiver, assisted GPS taking advantage of cell tower data, a Wireless Local Area Network IEEE 802.11 (WiFi) positioning system, cell-site multilateration, satellite multilateration, inertial system, or a hybrid positioning system. Hybrid positioning systems find location using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

The system may include a deployment subsystem 112, configured for attachment to the platform 102, having an interface on line 106 to supply an enablement signal with an identification code, in response to determining the mobile platform stationary location. A communications subsystem 114 is configured for attachment to the platform, and has an interface to receive verification information including the enablement signal, identification code, and the stationary geographic location. In the event that the system includes a selectively engageable media projection subsystem, as explained below, the verification information may include the determination that media is being projected (the media projection subsystem is engaged). In some aspects the deployment subsystem may be a component of the location or communications subsystem. For example, the deployment system may be understood to be engaged if the mobile platform is located or communication (as described below).

The communications subsystem 114 has an interface, connected to antenna 116, to transmit the verification information. In some aspects, the identification code can be extrapolated from an address associated with the communications subsystem 114, the location subsystem 104, or the platform 102. Otherwise, the identification code is a code loaded into memory 118, or alternatively it can be a mechanical device, such as a DIP switch. The most typical examples of a communication subsystem are cellular systems (e.g., Global System for Mobile Communications (GSM), Universal Mobile Telecommunications System (UMTS)-time division duplexing (TDD), Long-Term Evolution (LTE), $4^{th}$ Generation, or $5^{th}$ Generation), and the like. Less typically, the communications subsystem may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication messages may be stored in the platform memory 118 and periodically downloaded using a wireless or hardwire connection. The system 100 is not limited to any particular type of communication subsystem.

One advantage of system 100 is that the parking location of a mobile platform can be monitored and controlled. In its most basic form, the system may be useful in ensuring that certain areas are blocked and subsequently made available for cultural events and priority vehicle parking. As another example, the system may be used to determine that a rental car or scooter has been returned to a proper specified location. Yet another example would be for creating a known parking space in support of a mobile car washing, detailing, or maintenance service.

Optionally as indicated in phantom, the system 100 may include a media projection subsystem 108, configured for attachment to the platform 102, having an interface 110 to project media. In one aspect, the media projection subsystem 108 is configured for media projection only when the platform 102 is parked in a stationary location (position). In one aspect, the media projection subsystem 108 may be selectively enabled. Some examples of the media interface 110 include a screen over an exterior surface of the platform, including a lighted screen, a screen covering an interior (or exterior) window surface, a projector image appearing on a window or exterior surface of the platform, a projector image relayed through a vehicle rear view or side mirror, and any of the above-mentioned screens enabled with a field of light emitting diodes (LEDs), or a holographic display. In other words, the media interface may be a 2-dimensional or 3-dimensional image, which may or may not be active (change images). The media interface 110 may also broadcast sounds as an alternative, or in addition, to the displayed image. In the case of a display screen, the screen may be deployed, from the roof or top of the platform 102, over the sides, front, top, or back of the platform. In the case of a holographic display, the image may be presented on top of, or over the platform 102 or alongside of the platform. Projector images may also be displayed on images near the platform, including sidewalks and buildings. The system is not limited to any particular type of display.

Optionally as indicated in phantom, the system 100 may further comprise a publically accessible Wireless Local Area Network (WLAN) IEEE 802.11 WiFi hotspot or access point (AP) 120, configured for attachment to the platform 102, and which is connected to antenna 122. WiFi is a likely choice since most user smartphone or personal communication devices are WiFi equipped. Alternatively, but less common, the access point 120 may be a Wireless Personal Area Network (WPAN) IEEE 802.15, examples of which include Li-Fi, wireless USB, and Bluetooth. Even more unlikely as an access point are Long Range Wireless systems. In the case of the WiFi hotspot being the communications subsystem 114, items 114 and 120 would be collocated. Otherwise, the WiFi hotspot 120 is connected to the communications subsystem 114 through line 106. In some cases, the deployment subsystem supplies the enablement signal in response to the WiFi hotspot being enabled.

The system 100 may further comprise a targeting software application 124 stored in a non-transitory memory, enabling a sequence of processor executable instructions permitting the selection of the stationary position from a plurality of potential stationary positions. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the systems described herein may include both a volatile memory unit and a non-volatile storage device. The memory may be implemented as shared memory and/or distributed memory in a network device. As shown, the targeting application 124 is embedded in the memory 126 of server 128, or in a network of servers (not shown). Alternatively, as shown in phantom, the targeting application 124 may be embedded in the memory 118 of the platform 102.

In one aspect, each potential stationary location has a corresponding weighted value. In another aspect, the identification code or platform is associated with a first entity, and the first entity receives a reward corresponding to the value of the selected stationary position. As used herein, an "entity" may be a person, a business, a corporation, or any type of social organization or business unit able to claim ownership of, or association with, the identification code, platform 102, system 100, server 128, or server clients (discussed below). In some aspects, the first entity receives no reward if the media projection subsystem 108 is not enabled or if the mobile platform 102 is not stationary. That is, in some aspects the entity only receives a reward if the media projection subsystem 108 is enabled. Otherwise, the entity receives a reward based upon the value of the stationary position.

The most obvious type of reward is money. However, the first entity may alternatively be rewarded with bitcoin, cryptocurrency, coupons, services, or social recognition (prestige). In one aspect, the target location is selected from a plurality of weighted (in value of importance) target locations, in response to the specific geographic location of where the media projection subsystem is located. For example, the target location may be weighted in response to geographic location factors such as proximate vehicular traffic, line of sight from a particular vantage point, proximate pedestrian traffic, proximity to cultural events, proximity to cultural facilities, and combinations thereof. A cultural event is generally understood to be an activity involving human beings. Likewise, a cultural facility is a facility used by human beings, such as a museum, office building, or grocery store parking lot. As a more explicit example, a target location may have a first value if the media projection subsystem 132 is enabled (e.g., parked) within X feet of a particular location, and second value, greater than the first value, if the media projection subsystem is enabled within X/2 feet of the same location. Other factors reflected in the weighting of the target locations may include the type of media being projected, the time of day, the day of the week, the date, the length of time the media is being projected, and combinations thereof.

There may be locations, such as parks, hospitals, or freeways where signage or parking is legally restricted, and in one aspect these locations are given a target value of zero. In one aspect, the system may even prevent the enablement of the media projection subsystem in legally restricted areas, or prevent the mobile platform from parking. The system 100 described herein is not limited to any particular factors weighting a target location. The system may be interactive in the sense that the first entity may select a deployment location after determining the value of a location. In this sense, the targeting application does not so much direct the media presentation subsystem to a particular predetermined location, as suggest multiple possible locations. Although the target locations and weights may be predetermined, in some aspects the weighting for non-predetermined areas may be calculated concurrently with the deployment of the media projection subsystem or parking operation. That is, the target locations and the target location weights need not necessarily be predetermined.

As is common in many computer systems, a processor 130 is connected to the bus line 106, to pull operating instructions from operating system (OS) 132 and software applications in memory 118, and manage communications between the various components of system 100. Likewise, server 128 would be enabled through the use of processor 132. For ease of understanding, the above-described functions have been described as individual components. However, it should be understood that in practice, multiple functions may be performed by a single device, subsystem, or software application.

Figure 2:
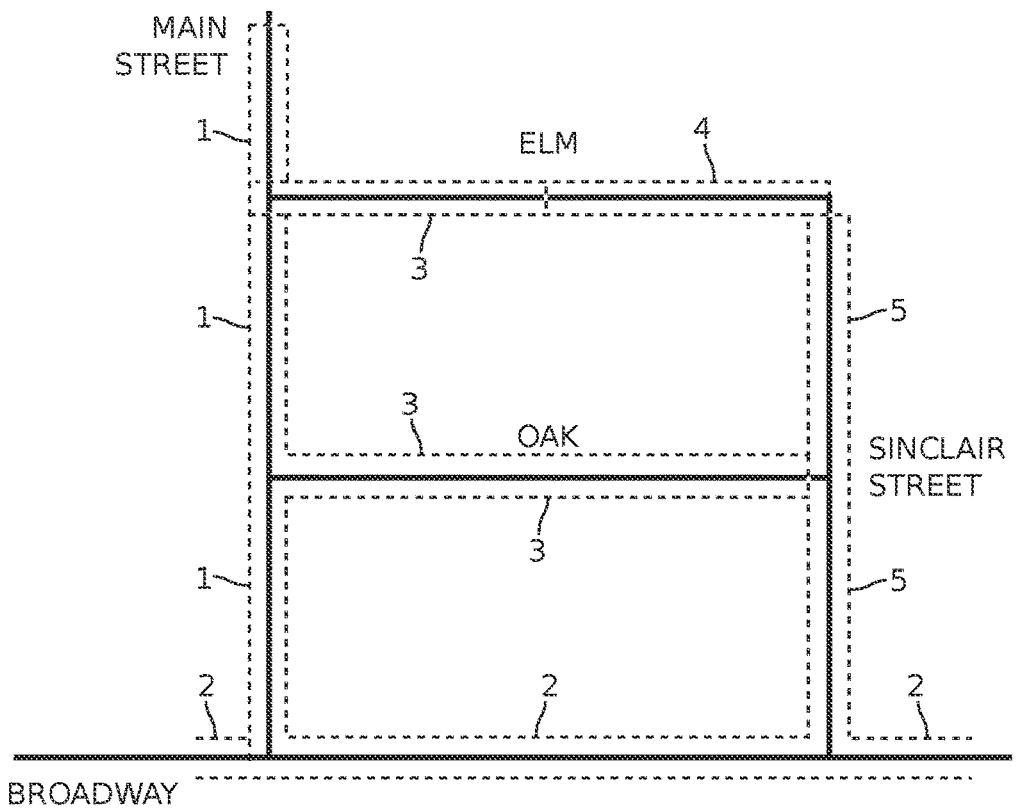
FIG. 2 is a plan view of geographic regions cross-referenced to the weighted value of various stationary positions.

FIG. 2 is a plan view of geographic regions cross-referenced to the weighted value of various stationary positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

Returning to FIGS. 1A and 1B, in one aspect the communications subsystem 114 receives media uploads from the server 128, and the communications subsystem 114 provides the media uploads to the media projection subsystem 108 for presentation. In another aspect, the platform 102 further comprises a camera 136 having an output on line 106 to supply images of a proximate geographic location to the platform 102. The communications subsystem 114 transmits these images to the server 128 or stores them in local memory 118. In one variation, a facial recognition software application 138, a form of Biometric Artificial Intelligence, is stored in the non-transitory memory 126 of the server 128, enabling a sequence of processor executable instructions for comparing the received camera images to facial data, and cross-referencing recognized facial data to associated publically available social network data. DeepFace is an example of one such facial recognition system. Optionally, the facial recognition software application 138 may include components that select media in response to the social network data and transmit the media to the platform communications subsystem 114. The communications subsystem 114 may receive the media uploads from the server 128, and provide the media uploads to the media projection subsystem 108 for presentation.

The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the media projection subsystem 108 has been enabled, the platform is stationary, or the platform is located in a particular location. In one aspect, simply recording a change in images, and thus proximate traffic, can be used as a means for proving media projection subsystem enablement. As an alternative, or in addition to the camera, the system may further comprise a proximity detector subsystem to sense nearby motion, which for simplicity can be thought of as being associated with reference designator 136, used to measure the density of proximate vehicular or foot traffic, which data is transmitted by the communications subsystem or recorded.

Figure 1C:
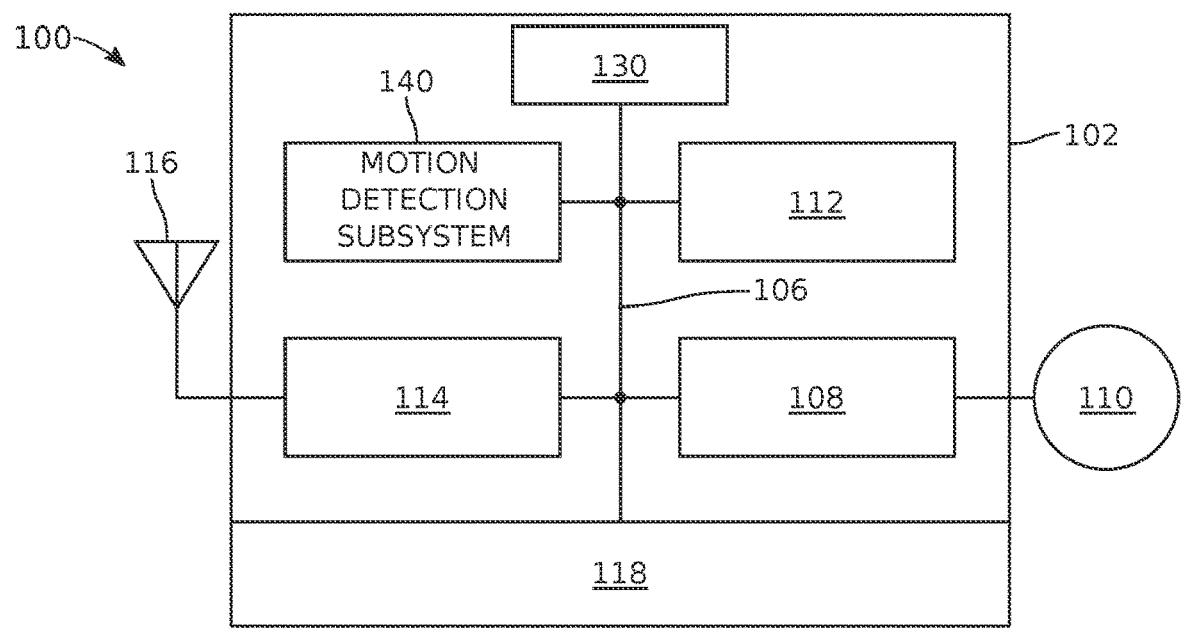

FIG. 1C is a schematic block diagram depicting a variation of the system. This variation of system 100 includes a motion detection subsystem 140, configured for attachment to a mobile platform, to determine if the mobile platform is stationary (temporarily at rest). In one aspect, the motion detection subsystem is one of the location subsystems described above. As an alternative, or in addition to one of the above-described location subsystems, the motion detection subsystem may a simple IMU or a may be a signal from a vehicle accelerometer indicating when the speed of the vehicle is zero miles per hour. A media projection subsystem 108 is configured for attachment to the mobile platform 102, and has an interface to project media 110 as described above. A deployment subsystem 112 is configured for attachment to the mobile platform 102, and has an interface on line 106 to supply an enablement signal with an identification code, in response to the mobile platform 102 being stationary. A communications subsystem 114 is configured for attachment to the mobile platform 102, and has an interface to receive verification information on line 106 including the enablement signal and identification code. The communications subsystem has interface to antenna 116 to transmit the verification information. Alternatively, the verification information may be stored in memory 118. As described above, the described components are differentiated for clarity, but in practical application, some of the above-described features may be performed by a single subsystem.

In one example, the media projection subsystem 108 is permanently engaged, or at least engaged when an attached vehicle is being operated. That is, the media projection subsystem may be enabled even when the mobile platform is in motion. In this case, the design of the media projection subsystem may be such that it can tolerate wind resistance, vibration, and mechanical shock. When the mobile platform (e.g., an automotive vehicle) temporarily stops in traffic without necessarily being parked, it is assumed that the projected media becomes more valuable, as it is easier to see and hear than when the vehicle is in motion. The amount of time the vehicle is stopped is transmitted by the communications subsystem or recorded. In one aspect, an entity associated with the vehicle receives a reward based upon the amount of time the vehicle is stopped, with more stationary time yielding a greater reward. In addition, if the motion detection system 140 includes a means of determining location, the reward might also be based on location, as described above and in FIG. 1D, with some stationary locations being of greater value than other stationary locations.

Figure 1D:
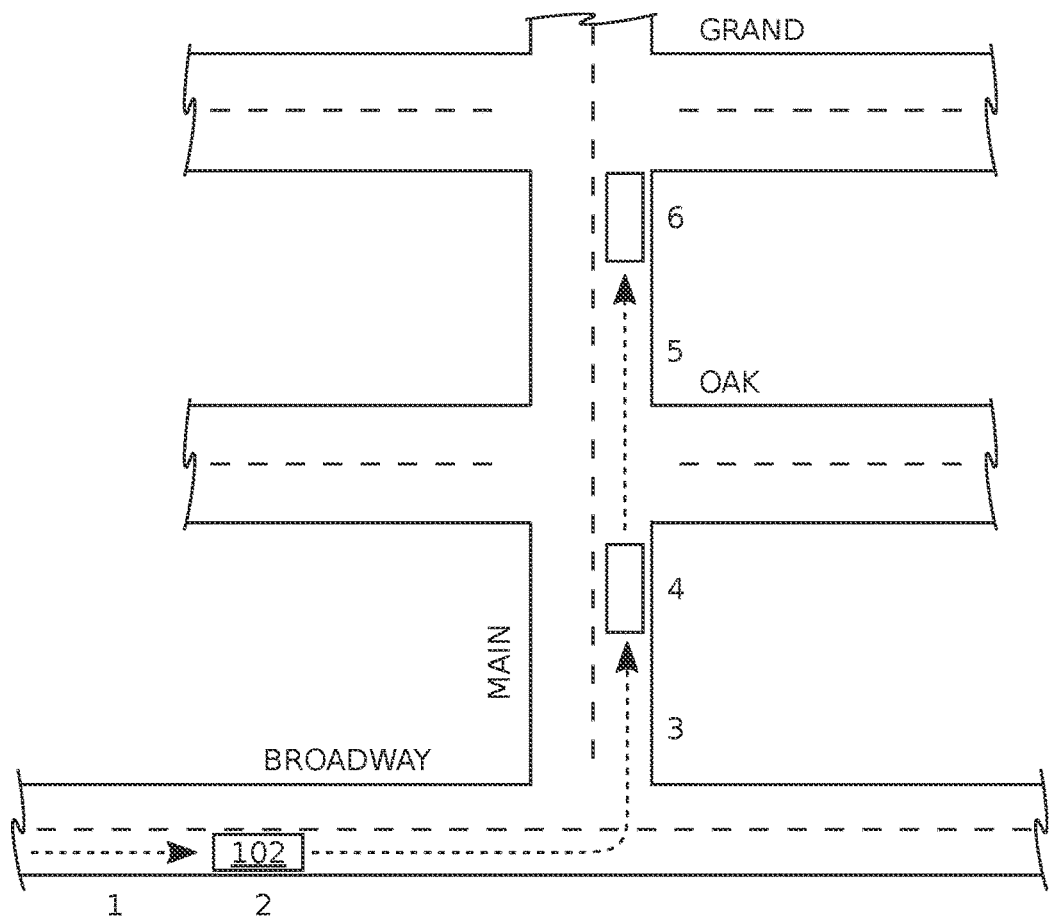

FIG. 1D is a diagram depicting the system of FIG. 1C in operation. A mobile platform 102 is in motion along Broadway as indicated by reference designator 1. The platform 102 comes to rest at the intersection of Broadway and Main, in response to a traffic light or stop sign, as indicted by reference designator 2. The system measures the amount of time that the mobile platform is at rest. In some aspects the system measures the duration of the rest and the location of the rest. A reward may be given to an entity of the mobile platform simply for the platform coming to rest. Additional rewards may be based upon the duration of the rest and the location of the resting location. The system may also provide a reward based upon the mobile platform simply being in motion (reference designator 1). Likewise, the system similarly monitors the mobile platform moving to the intersection of Main and Oak (reference designator 3), stopping at the intersection of Main and Oak (reference designator 4), moving to the intersection of Main and Grand (reference designator 5), stopping at the intersection of Main and Grand (reference designator 6), and provide rewards accordingly as described above.

Figure 3:
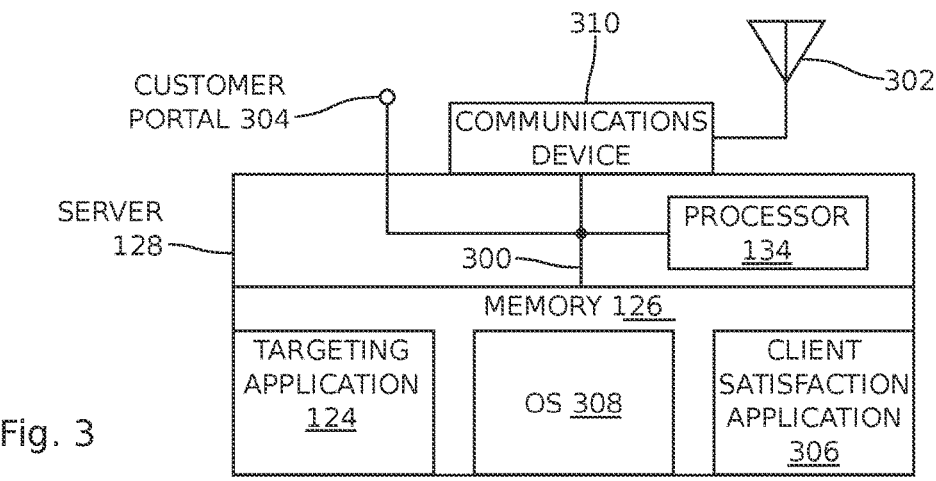
FIG. 3 is a schematic block diagram of the mobile location system server.
Figure 1B:
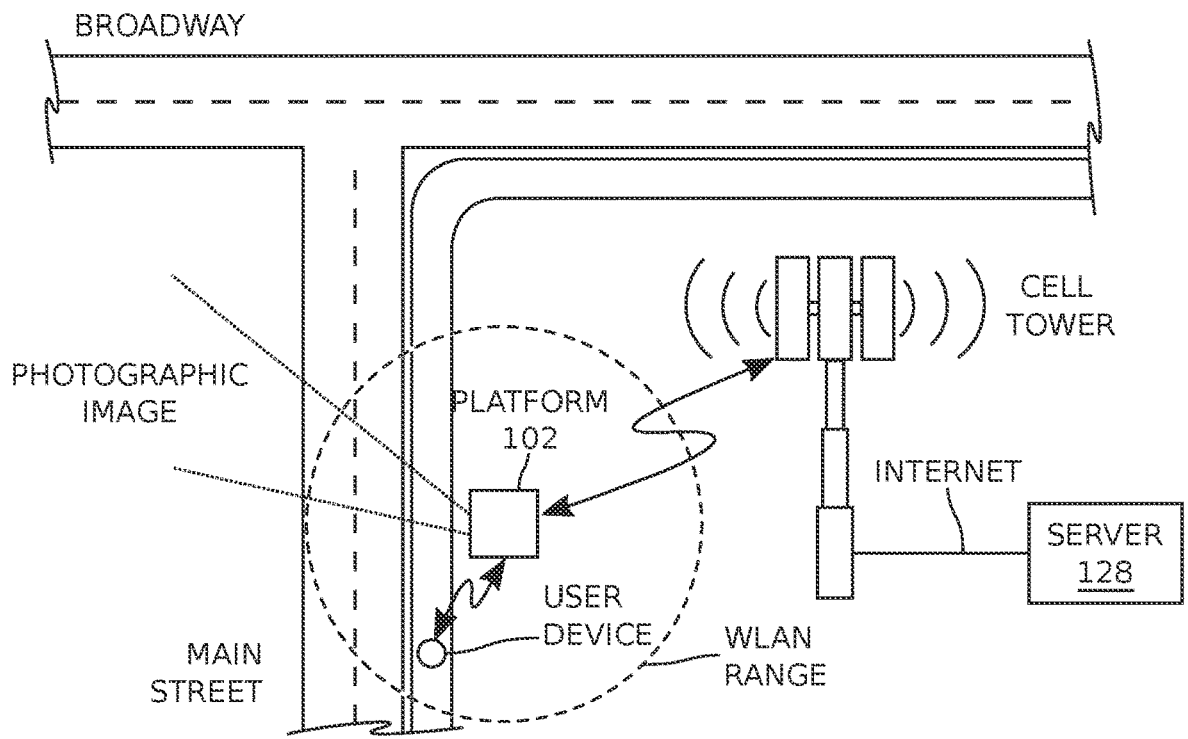

FIG. 3 is a schematic block diagram of the mobile location system server. For convenience, all the components associated with server 128 are shown embedded as a single schematic block, but it should be understood that these components are not necessarily embedded in a single hardware unit, or in communication with each other. Alternatively, the software applications may be cooperating components of an overall software system. As shown, the server 128 comprises a first interface on line 300, connected to antenna 302 through communications device 310, to receive the verification information from the platform communication subsystem. Although depicted as a wireless communications system, it should be understood that the linkage represented by communication device may represent Internet and Ethernet linkages to cell tower base stations and cloud search engines, or any other means of communication, and may generally be referred to as portal. A second interface on line 304, also referred to as a customer portal, receives first client goals such target market, deployment hours, deployment rate, and midair positions to name a few examples. Otherwise, a client satisfaction software application 306, embedded in memory 126, includes processor instructions for determining the above-mentioned client goals. For example, the client satisfaction software application 306 may determine positions meeting the first client goals in response to factors such as location, local demographics, traffic, population density, length of deployment, and combinations thereof. An operating system 308 works in cooperation with the processor 134 to enable software applications in memory 126 and to process information to and from communications device 310.

In one example, platform 102 (see FIG. 1A) comprises a selectively enabled media projection subsystem 108 (see FIG. 1A) and the server 128 is associated with a second entity. Then, a server client provides a reward to the first and/or second entity when the media projection subsystem is enabled, but provides no reward to the first and/or second entity when the media projection subsystem is not enabled. Similarly, rewards to the first or second entities may be based upon the volume of traffic through the WiFi hotspot, or the location of stationary parking spot.

Figure 4:
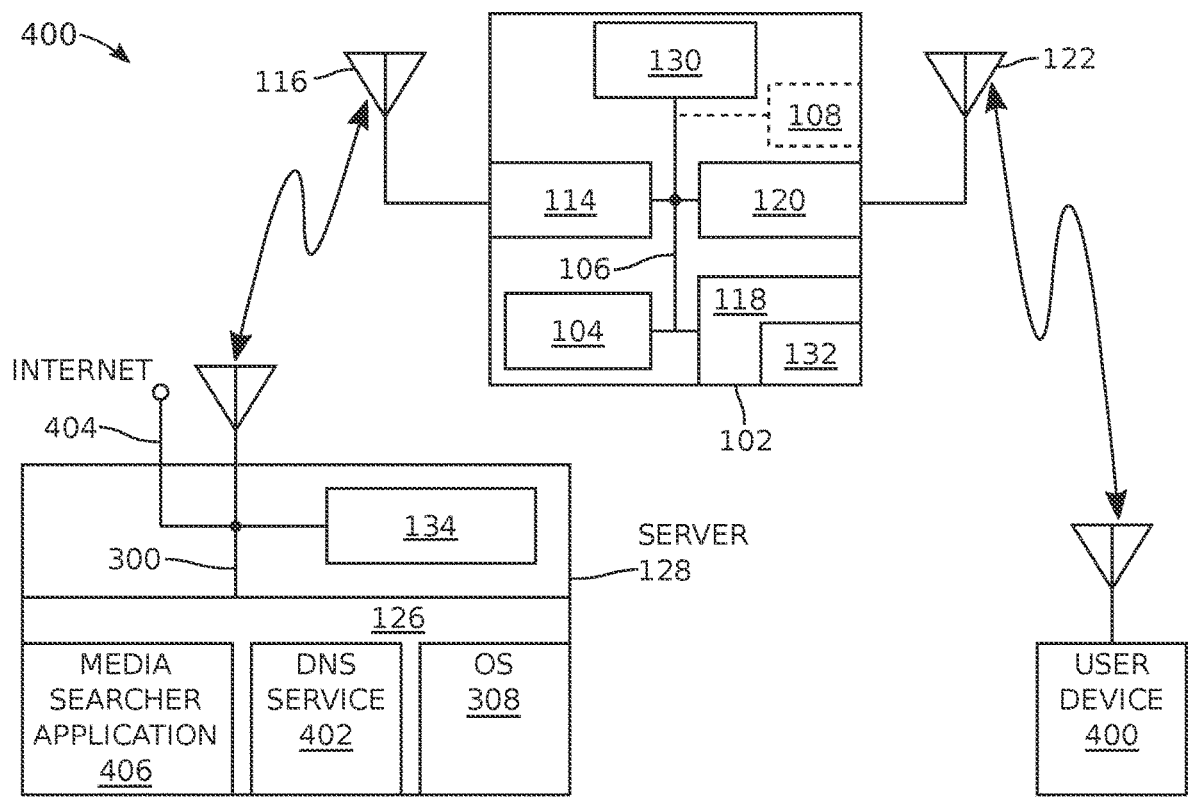
FIG. 4 is a schematic block diagram of a mobile access point (AP) system.

FIG. 4 is a schematic block diagram of a mobile access point (AP) system. The system 400 comprises a location subsystem 104, configured for attachment to a mobile platform 102, to determine a stationary geographic location of the platform, which is supplied on line 106. A communications subsystem 114, configured for attachment to the platform 102, has an interface on line 106 to receive verification information including the geographic location, and an interface to transmit the verification information to a server via antenna 116. A WLAN IEEE 802.11 WiFi hotspot 120 is configured for attachment to the platform 102. The WiFi hotspot 120 accepts Uniform Resource Locator (URL) address requests from a user device 400 (e.g., a smartphone) via antenna 122, and transmits the URL address requests, via the communications subsystem 114, to a Domain Name System (DNS) service 402 embedded with server 128. The DNS service 402 makes address searches, if necessary, via the Internet interface on line 404.

Optionally, the platform 102 may comprise a media projection subsystem 108 shown in phantom, as explained above. In this case, the server 128 may further comprise a media searcher application 406, stored in a non-transitory memory 126 and enabled as a sequence of processor instructions for accessing media associated with URL addresses, and transmitting the media to the platform communication subsystem 114. The communications subsystem 114 receives the media uploads from the server 128 and supplies the media uploads to the media projection subsystem 108 for presentation. In one aspect, the media projection subsystem 108 is selectively enabled. The media projection subsystem enablement may be triggered locally before the platform 102 is parked, or remotely after the platform arrives at the desired stationary position, for example, via instructions sent from the server 128, or using an independent remote control device (not shown).

Alternatively, if there is no media projection subsystem 108, or if the media projection subsystem is not enabled, the communications subsystem 114 may receive the above-described media uploads from the server 128, and provide the media uploads to the WiFi hotspot 120, which in turn supplies the media uploads to the user device 400.

In another variation, as described in the explanation of FIG. 1A, the system 400 further comprises a targeting software application (124, see FIG. 1A) that permits the selection of the stationary position from a plurality of potential stationary positions. Each potential stationary position may have a corresponding weighted value, and an entity associated with the platform 102 may receive a reward corresponding to the value of the selected stationary position.

Figure 5:
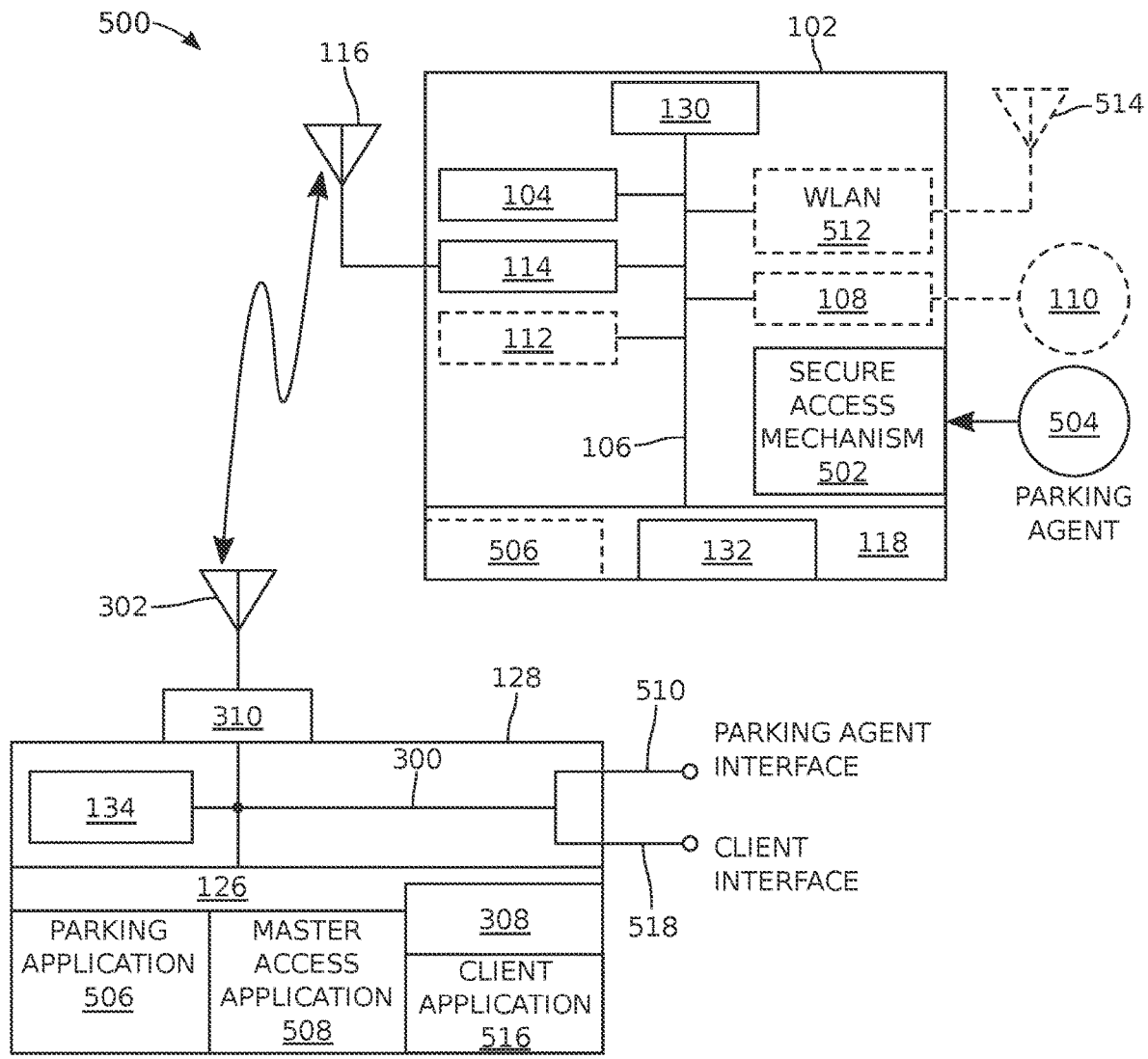
FIG. 5 is a schematic block diagram of a gig parking system.

FIG. 5 is a schematic block diagram of a gig parking system. The system 500 comprises a mobile platform 102 with a secure access mechanism 502 configured for attachment to the platform. The secure access mechanism 502 permits a trusted parking agent 504 to gain control over the platform 102, as explained below. A location subsystem 104, may be configured for attachment to the platform 102, to determine the geographic location of the platform. A communications subsystem 114, may be configured for attachment to the platform 102, with an interface to receive verification information on line 106 including an identification code associated with the parking agent, an identification code associated with the platform, and the geographic location. The communications subsystem has an interface to transmit the verification information via antenna 116. In some aspect, verification information is recorded in local memory 118 in addition to, or instead of using real-time communications. A parking mechanism 506 supplies a destination parking location to the parking agent. Simple examples of a parking mechanism include a verbal telephone conversation, text message, or email, where the parking agent receives parking destination instructions. Alternatively as shown, the parking mechanism is a software application 506 stored in a non-transitory memory 118, enabling a sequence of processor executable instructions for supplying a destination parking location. In one aspect, the parking agent 504 is directed to one particular destination parking location. However, it should be understood that based upon local conditions and traffic, the parking agent may be required to park in a different, but close-by, location. In this case the parking application 506 may be able to supply alternative locations, or limits to how far the actual destination may vary from the assigned destination. In one aspect, the parking agent 504 is able to choose from a list of mobile platforms with corresponding destination parking locations, starting parking locations, and timing restraints, and the parking application 506 accepts the parking agent's selection. For example, the purpose of moving the mobile platform may be to operate a media projection subsystem, where some locations are more desirable than others. As explained below, it should be understood that the parking agent may be able to choose from a plurality of mobile platforms that may have common or different parking location requirements. The parking application 506 may be embedded with a server memory 126, or optionally as indicated in phantom, in platform memory 118.

In the case of the mobile platform 102 being an automobile vehicle, the secure access mechanism 502 may be a traditional lock-and-key mechanism, keypad, or a wireless key fob. Otherwise, but not shown, the secure access mechanism 502 may be at least partially enabled as an access software application embedded in platform memory, enabled as a sequence of processor executable steps for unlocking the platform and permitting the platform to be started, moved, and locked upon reaching the destination. For example, the secure access mechanism may include a hardware component keypad to accept an access code that is verified by the software component of the secure access mechanism. Otherwise, a parking agent 504 may use a smartphone to request an access code from a master access software application 508, embedded in server memory 126, comprising a sequence of processor executable steps for verifying parking agents and matching parking agents to platforms. In another aspect, the master access application 506 may send a message to the secure access mechanism 502, via communications subsystem 114, to unlock the car and permit parking agent 504 control of the platform 102, following parking agent verification.

Similar to the targeting application described in FIG. 1A above, each potential destination parking location (and corresponding mobile platform) in the parking application may have a corresponding weighted value. If the platform 102 is associated with an entity (as defined above), then the entity may receive a reward corresponding to the value of the selected destination parking location. Alternatively, or in addition, the parking agent 504 may receive a reward corresponding to the value of the selected destination parking location.

Figure 6:
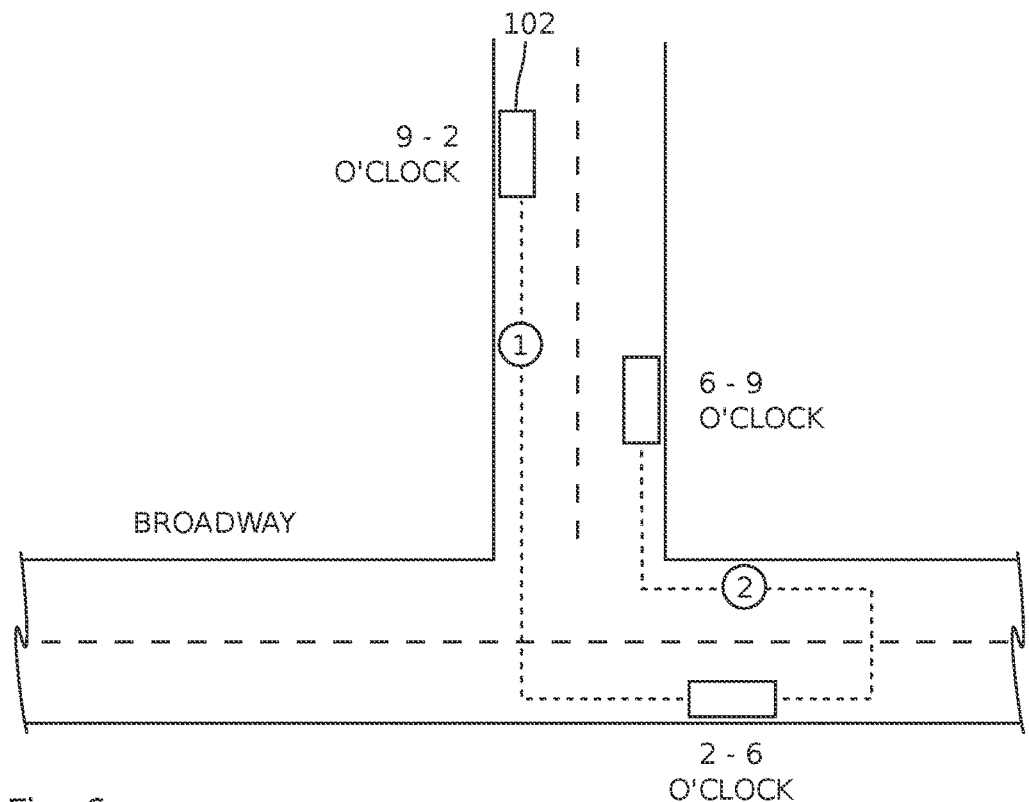
FIG. 6 is a diagram depicting an exemplary gig parking operation.

FIG. 6 is a diagram depicting an exemplary gig parking operation. A first entity leaves a mobile platform parked on Main Street. The platform 102 is shown parked along the West side of Main Street in the hours from 10 until 2 o'clock. At 2 o'clock a first parking agent moves the platform to the South side of Broadway, where it is parked from 2 until 6 o'clock. At 6 o'clock a second parking agent moves the platform 102 to the East side of Main Street, where it is parked until 9 o'clock. At 9 o'clock the first entity retrieves their platform Returning to FIG. 5, in one aspect the parking software application 506 has a parking agent interface 510 supplying, in potential mobile platforms with corresponding destination parking locations, corresponding starting parking locations, and timing constraints, to parking agents 504. One example of a timing restraint is the requirement to have the platform parked at a certain time, or before the expiration of a certain time. The parking agent interface 510 is shown as a simple line in the figure. In one aspect, the parking interface line 510 represents an Internet connection to the server-embedded parking application 506 that is accessed via an Ethernet or a wireless connection. The wireless connection may be a cellular network, via antenna 302, or a combination of WiFi and cellular communication links. In the case of the parking application 506 being embedded with the platform memory 118, the parking agent 504 may communicate wirelessly via the communications subsystem 114, or via an optional WLAN or WPAN subsystem 512 and antenna 514. Since the WLAN/WPAN subsystem is optional it is shown in phantom. The WLAN/WPAN subsystem 512 is most likely WiFi or Bluetooth. In one aspect, a WiFi subsystem 512 would be a publically accessible hotspot, with the features of DNS service and media searching as described in FIG. 4 above. If the parking application 506 is embedded in platform memory 118, the parking agent interface may connect directly to the platform 102, or indirectly to the platform via the server communications links.

In one aspect, the parking agent 504 receives a reward responsive to factors such as platform starting parking location, destination parking location, distance between starting and destination parking locations, time restraint, travel time between starting and destination parking locations, time of day, day of the week, and combinations thereof. Likewise, an entity associated with the platform 102 may receive a reward responsive to factors such as platform starting parking location, destination parking location, distance between starting and destination parking locations, time restraint, travel time between starting and destination parking locations, time of day, day of the week, and combinations thereof. The entity is more likely to receive a reward if they act as the parking agent or if they permit their platform to be used (through a parking agent) by a service organization or client associated with the server 128. A client software application 516 may be embedded in server memory 126, accessible through client interface 518. For example, a server client may reward the entity for permitting the use of their platform as a WiFi hotspot, or as a platform for a media projection subsystem when parked at certain locations, at certain times. In this case, the server client, or an organization acting as an intermediary between the server client, entity, and parking agent, may distribute rewards from the server client to the parking agent and entity. This is one case in which the server client or intermediary organization is willing to pay rewards for parking in any one of a number of potential destination parking locations. These potential destinations may have weighted values with corresponding rewards.

Alternatively, the parking agent 504 may be performing preforming a service for the platform-owning entity. In this case, the entity may pay a reward responsive to factors such as platform starting parking location, destination parking location, distance between starting and destination parking locations, time restraint, travel time between starting and destination parking locations, time of day, day of the week, and combinations thereof. As above, an organization associated with the server 128 may act as an intermediary between the entity and parking agent 504. Although the entity may be associated with just a single mobile platform, it should be understood that the server may be operated by the entity and managing a fleet of mobile platforms. Likewise, a server client entity may manage a single platform or a fleet of mobile platforms.

For example, a first entity may drive their automotive vehicle mobile platform to the airport and leave it in short-term parking. Since the first entity will be traveling for an extended period of time, they would prefer that their vehicle be home for safety sake, and to save on parking fees. The first entity arranges for a first parking agent to pick up the vehicle in short-term parking and drive it to the entity's home. Two weeks later, prior to returning from the trip, the first entity engages a second parking agent to drive the vehicle back to short-term parking. Optionally, the second parking agent receives an extra reward based upon finding a choice location in short-term parking or minimizing the time that the vehicle is parked. This is a case where the parking agent 504 must accept the single destination parking location provided by the parking application 506. As another example, a parking agent can be used to deliver an automobile to and from a service business, such as vehicle maintenance or washing.

As noted above, a selectively enabled media projection subsystem 108 may be configured for attachment to the platform 102, having an interface 110 to project media. Since the media projection subsystem 108 is optional, it is shown in phantom. In this case, an optional deployment subsystem 112 receives an enablement signal in response to the media projection subsystem 108 being enabled, and the communications subsystem 114 receives verification information including the enablement signal from the deployment subsystem, or directly from the media projection subsystem 108.

Figure 7:
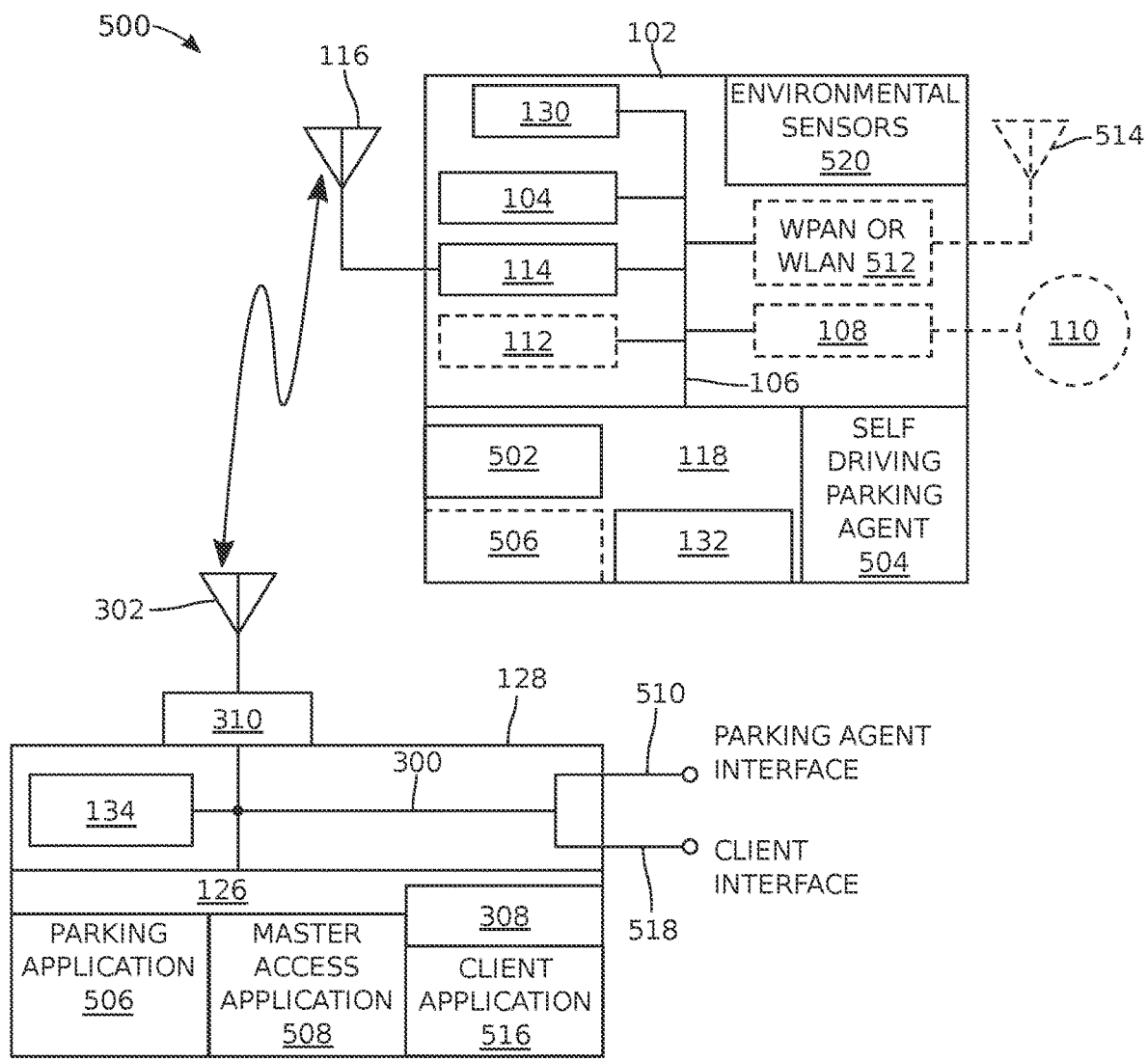
FIG. 7 is a schematic block diagram depicting a gig parking agent enabled as an autonomous self-driving software application component.

FIG. 7 is a schematic block diagram depicting a gig parking agent enabled as an autonomous self-driving software application component. In this aspect, the parking agent autonomous driving software application 504 is stored in platform memory 118, enabling a sequence of processor executable steps for driving an automotive vehicle mobile platform. In this case, the master access application 508 may send a message, via communication subsystem 114, to the secure access mechanism software application 502, allowing the autonomous self-driving parking agent driving privileges, while the parking application 506 directs the autonomous self-driving parking agent 504 to a particular destination parking location. It should also be understood that the secure access mechanism and parking agent autonomous self-driving application may be complimentary components in a single software routine.

As is well known in the art, a self-driving vehicle is equipped with environmental sensors, such as cameras, microphones, proximity and motion sensors, and LIDAR. In one aspect, the parking agent 504 may receive wireless traffic updates and destination parking information from a traffic-based external source (not shown) or from the server 128. The self-driving parking agent 504 may receive destination instructions from the entity, or an intermediary organization acting on behalf of the entity, to go to a particular destination, e.g., for the personal convenience of the entity. Alternatively, the entity may permit the vehicle to be "hired out" to a server client or intermediary organization, in which case the client or organization may select the destination. As another alternative, the parking application 506 may include a software algorithm that selects a destination, provided from a list of potential destinations, based upon a rationale such as efficiency or reward.

The systems described above can be adapted for use in a model where an advertiser pays for service based upon performance. For example, an advertising (server) client may contract with a system provider stipulating a target market and deployment hours/rate. The system provider (intermediary organization) determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted location system, where the mobile sign or WiFi hotspot may be selectively deployed. In cooperation with the deployment of the sign or WiFi, an organization or user associated with the sign or hotspot is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the sign and/or WiFi have actually been deployed, and once deployed, the location of the system. In some aspects, the sign is a type of visual display, but other aspects may include just an auditory presentation, a combination visual and auditory presentation, or a presentation that is able to interact with a proximate viewer.

In one aspect, the system communicates a deployment message and supporting systems receive the deployment message and determine the deployment location. This information can be relayed in real-time to a server entity. Alternatively, the information can stored in memory of the supporting system and transferred to the server at periodic intervals or upon the attainment of predetermined metrics such as the number of deployments.

Figure 8:
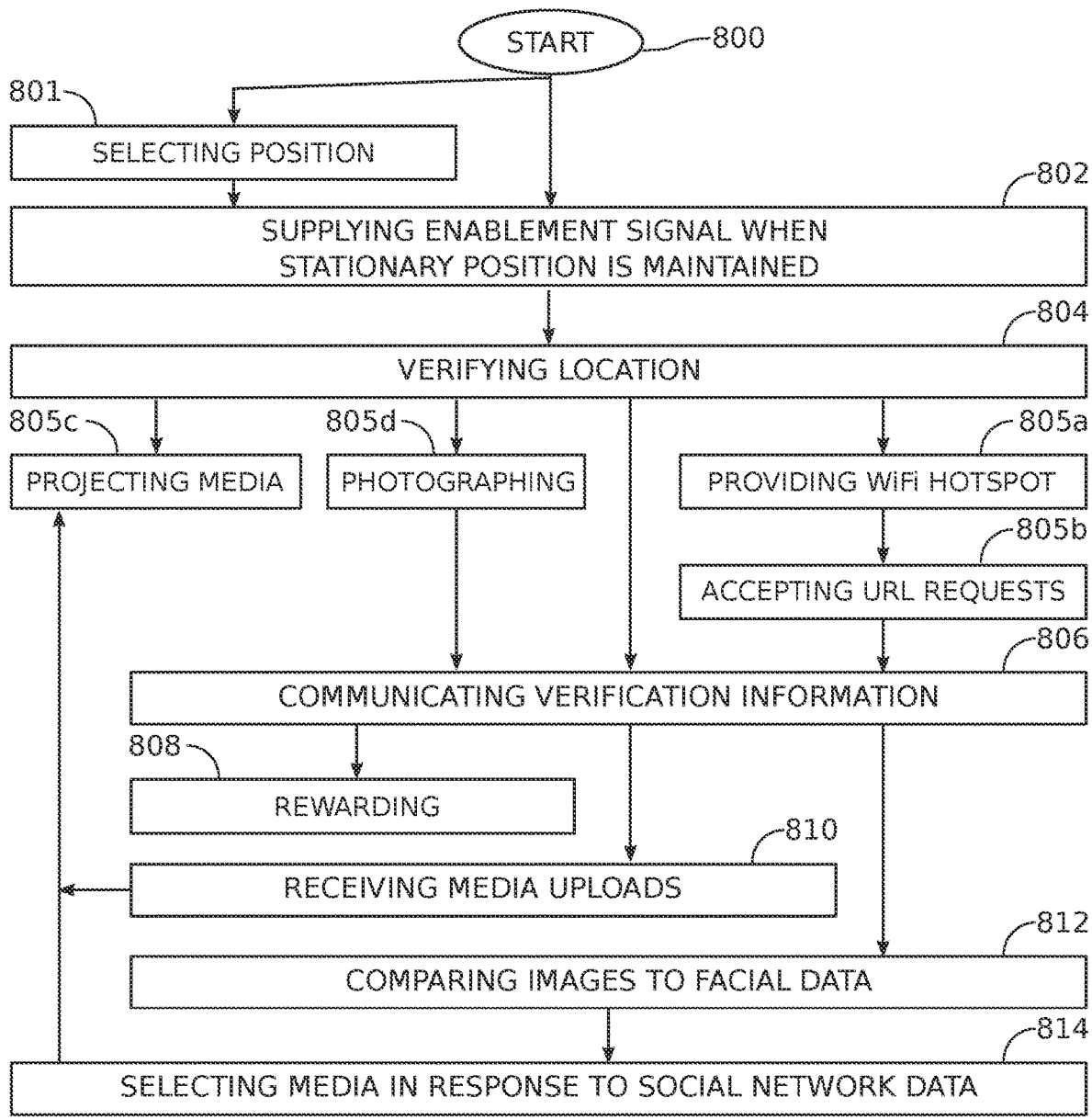
FIG. 8 is a flowchart illustrating a method for mobile platform positioning.

FIG. 8 is a flowchart illustrating a method for mobile platform positioning. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 800.

Step 802 supplies an enablement signal with an identification code, in response to a mobile platform maintaining a selected stationary position. Step 804 verifies the geographic location of the platform. Step 806 communicates verification information including the enablement signal, identification code, and geographic location to a server. In one aspect, Step 805a provides a publically accessible WLAN IEEE 802.11WiFi hotspot attached to the platform. In Step 805b the WiFi hotspot accepts URL address requests from a user device proximately located to the geographic location. Then, communicating verification information in Step 806 includes communicating the URL address requests to a DNS service.

In another aspect, Step 801 selects the stationary position from a plurality of potential stationary positions having corresponding weighted values, and Step 808 may provide a reward to an entity associated with the platform responsive to the value of the selected stationary position.

Optionally, Step 805c projects media from a media projection subsystem attached to the platform, with the media being a displayed image, broadcast sound, or a combination thereof. If Step 805c selectively projects media from the media projection subsystem, then Step 808 may supply a reward to an entity associated with the platform when the media projection subsystem is enabled. In one variation, in Step 810 the media projection subsystem receives media uploads from the server for projection.

In yet another variation, Step 805d photographs images of a proximate geographic location to the platform, and communicating verification information in Step 806 includes communicating the photographed images to the server. In addition to, or instead using a camera, Step 805*d* may use proximity sensors record nearby activity data and supply it to the communications subsystem for transmission or recording. Optionally in Step 812 a facial recognition software application stored in a non-transitory memory of the server, enables a sequence of processor executable instructions for comparing the received camera images to facial data, and cross-referencing recognized facial data to associated publically available social network data. In addition, in Step 814 the facial recognition application selects media in response to the social network data, and transmits the media to the platform communications subsystem for projection by the media projection subsystem.

Figure 9:
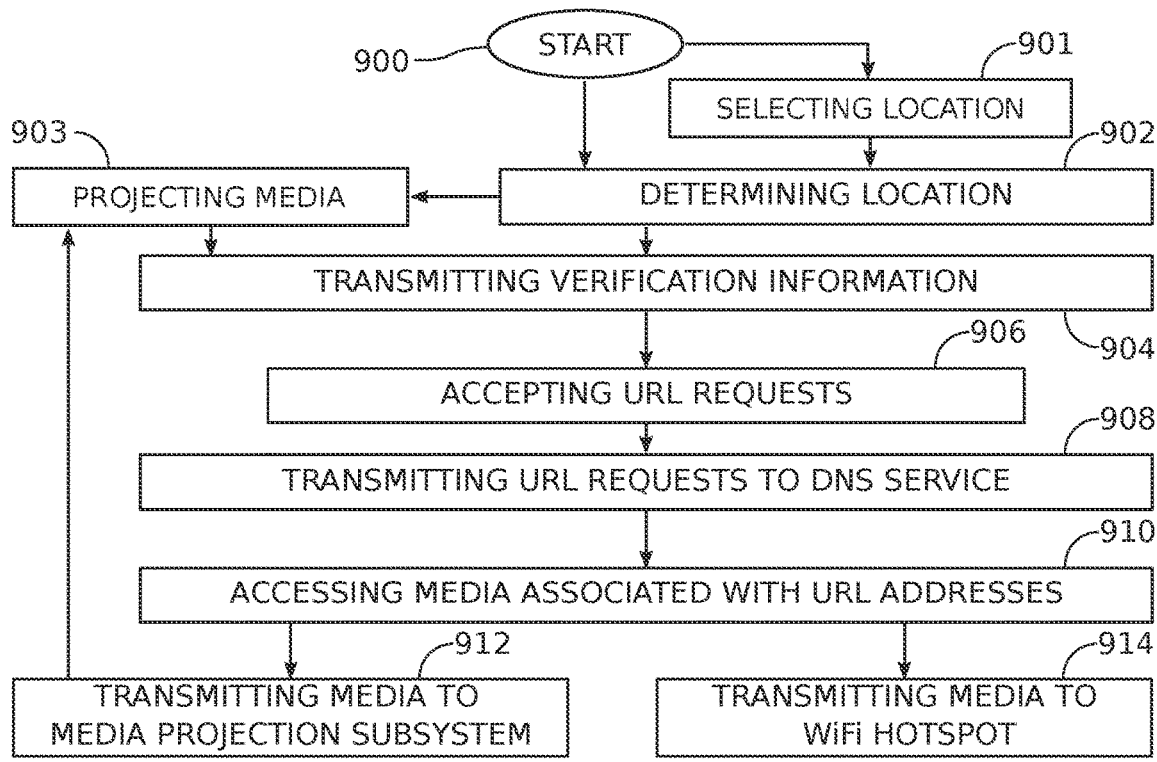
FIG. 9 is a flowchart illustrating a mobile communication method.

FIG. 9 is a flowchart illustrating a mobile communication method. The method starts at Step 900. In Step 902 a location subsystem attached to a mobile platform determines the geographic location of the platform. Step 904 transmits verification information including the geographic location to a server. In Step 906 a WLAN IEEE 802.11 WiFi hotspot attached to the platform accepts URL address requests from a user device. Step 908 transmits the URL address requests to a DNS service. In Step 910 a media searcher application, stored in a non-transitory memory of the server and enabled as a sequence of processor instructions, accesses media associated with URL addresses. Step 912 transmits the media to a media projection subsystem attached to the vehicle for projection. Alternatively, Step 914 transmits the media to the WiFi hotspot for uploading to a connected user device.

In one aspect Step 903 uses a media projection subsystem attached to the platform to project media from the platform. In another aspect, Step 901 uses a targeting software application stored in a non-transitory memory to enable a sequence of processor executable instructions permitting the selection the geographic location from a plurality of potential geographic locations that may have weighted values. Step 916 optionally supplies a reward to an entity associated with the platform, corresponding to the value of the selected geographic location.

Figure 10:
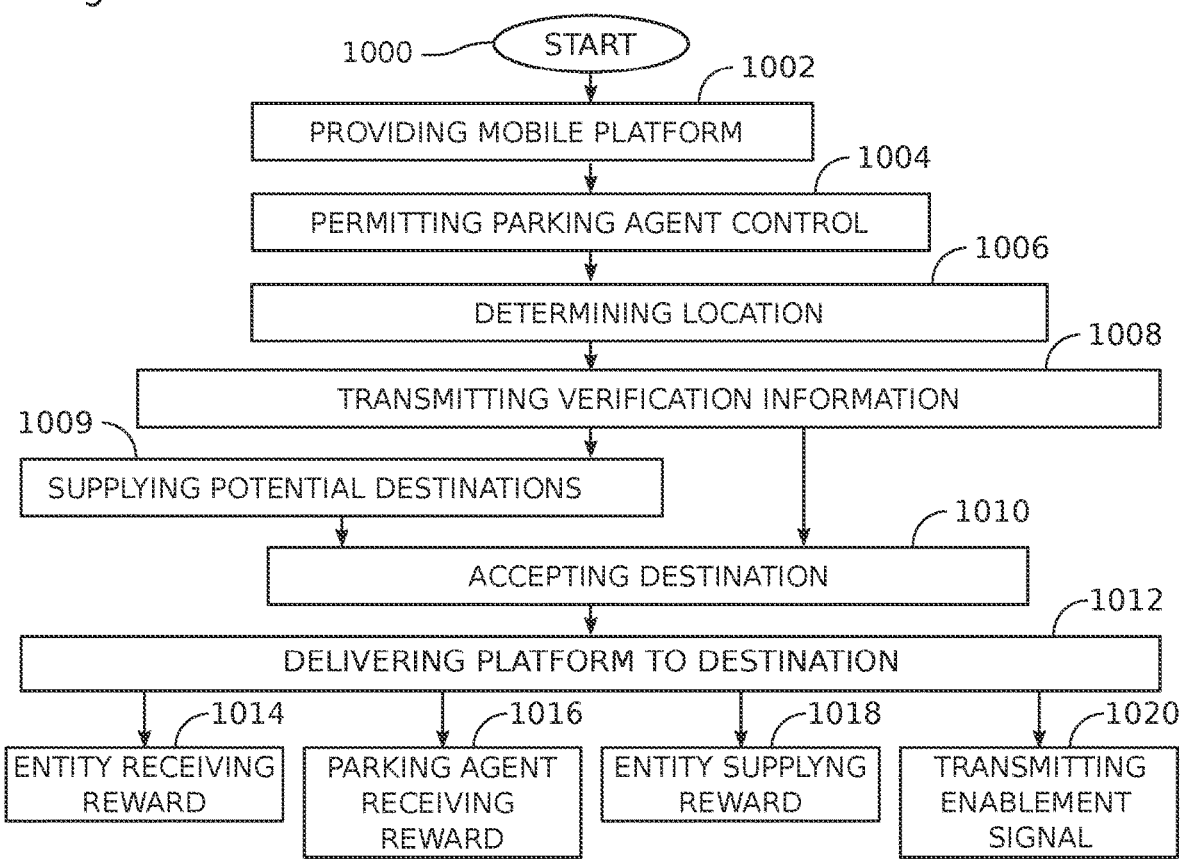
FIG. 10 is a flowchart illustrating a method for gig parking.

FIG. 10 is a flowchart illustrating a method for gig parking. The method starts at Step 1000. Step 1002 provides a mobile platform. Step 1004 permits a trusted parking agent to gain control over the platform. As noted above in the explanation of FIGS. 5-7, the parking agent can be a human being or an autonomous driving software application stored in a non-transitory memory enabling a sequence of processor executable steps for driving an automotive vehicle mobile platform. optionally, Step 1006 may determine the geographic location of the platform. Note: Step 1006 may be performed before Step 1004. Optionally, Step 1008 transmits verification information to a server, including an identification code associated with the parking agent, an identification code associated with the platform, and the geographic location. Alternatively, Step 1008 records the verification information in local memory. Step 1010 accepts a destination parking location, and in Step 1012 the parking agent delivers the platform to the accepted destination parking location. In one aspect, Step 1009 supplies the parking agent with a plurality of potential mobile platforms with corresponding destination parking locations, starting parking locations, and timing constraints. Then, accepting the destination parking location in Step 1010 includes accepting a mobile platform, with a corresponding destination parking location, selected by the parking agent. In some aspect, the parking agent can park a mobile platform in a number of destination parking locations. In greater detail, Step 1009 may supply a list of potential platforms with corresponding starting parking locations, destination parking locations, and timing restraints. The accepted destination parking location of Step 1010 may have a corresponding weighted value.

If Step 1002 provides a platform associated with a first entity, then in Step 1014 the first entity may receive a reward corresponding to the value of the destination parking location. Alternatively, or in addition, Step 1016 may supply a reward to the parking agent, corresponding to the value of the destination parking location. The rewards of Steps 1014 and 1016 may also be responsive to factors such as platform starting parking location, distance between starting and destination parking locations, timing constraints, travel time between starting and destination parking locations, time of day, day of the week, and combinations thereof. As another alternative, in Step 1018, the entity may provide a reward to the parking agent or an organization representing the parking agent responsive to the above-mentioned factors.

In one aspect, Step 1002 provides a mobile platform with a publically accessible WiFi hotspot. Alternatively, or in addition, Step 1002 provides a mobile platform with a selectively enabled media projection subsystem having an interface to project media. Then, Step 1020 may transmit an enablement signal in response to the media projection subsystem being deployed. In some aspects an enablement signal is transmitted after the WiFi is enabled.

Systems and methods have been provided for arranging for, managing, and monitoring parking locations, with the optional deployment of WiFi hotspots and media projection systems. Examples of particular message structures, schematic block linkages, and hardware units have been presented to illustrate the invention. However, the invention is not limited to merely these examples. Other variations and embodiments of the invention will occur to those skilled in the art.

We claim:

1. An independent contractor transportation system comprising:
   a plurality of mobile platforms, each mobile platform comprising:
      a secure access mechanism configured for attachment to the mobile platform, permitting a trusted transportation agent to gain control over the mobile platform;
      a location subsystem, configured for attachment to the mobile platform, to determine a geographic location of the mobile platform;
      a communications subsystem, configured for attachment to the mobile platform, having an interface to receive verification information including an identification code associated with the transportation agent, an identification code associated with the mobile platform, and the geographic location, and an interface to transmit the verification information;
   a transport mechanism supplying the transportation agent with a plurality of mobile platform selections; and,
   wherein the transportation agent delivers a mobile platform selected by the transportation agent to a corresponding destination parking location.

2. The system of claim 1 wherein the transport mechanism provides the transportation agent with a plurality of potential destination parking locations and accepts the destination parking location selected by the transportation agent.

3. The system of claim 1 wherein the accepted destination parking location has a corresponding weighted value.

4. The system of claim 3 wherein the mobile platform is associated with a first entity; and,
wherein an element selected from the group consisting of the first entity, the transportation agent, or both the first entity and transportation agent receives a reward corresponding to the value of the accepted destination parking location.

5. The system of claim 3 wherein the transport mechanism supplies a list of potential mobile platforms with corresponding starting parking locations, destination parking locations, and timing restraints.

6. The system of claim 4 wherein the reward is responsive to factors selected from the group consisting of mobile platform starting parking location, mobile platform destination location, distance between starting and destination parking locations, timing restraints, travel time between starting and destination parking locations, time of day, day of the week, and combinations thereof.

7. The system of claim 3 wherein the mobile platform is associated with a corresponding entity; and,
wherein the entity provides a reward responsive to factors selected from the group consisting of mobile platform starting parking location, mobile destination parking location, distance between starting and destination parking locations, timing restraints, travel time between starting and destination parking locations, time of day, day of the week, and combinations thereof.

8. The system of claim 1 further comprising:
a publically accessible access point, configured for attachment to the mobile platform, selected from the group consisting of an IEEE 802.11 Wireless Local Area Network (WLAN) WiFi hotspot, an IEEE 802.15 Wireless Personal Area Network (WPAN) device, and combinations thereof.

9. The system of claim 1 further comprising:
a media projection subsystem, configured for attachment to the mobile platform, having an interface to project media.

10. The system of claim 1 wherein the transport mechanism is an element selected from the group consisting of a user interface (UI) and an autonomous driving software application stored in a non-transitory memory enabling a sequence of processor executable steps for driving an automotive vehicle mobile platform.

11. The system of claim 1 wherein the transport mechanism is a software application stored in a non-transitory memory, enabling a sequence of processor executable instructions supplying a destination parking location.

12. An independent contractor transportation method comprising:
supplying a trusted transportation agent with a plurality of potential mobile platform selections;
permitting the transportation agent to gain control over a selected mobile platform;
the transportation agent accepting a destination parking location for the selected mobile platform; and,
the transportation agent delivering the selected mobile platform to the accepted destination parking location.

13. The method of claim 12 further comprising:
determining a geographic location of the mobile platform; and,
transmitting verification information to a server, including an identification code associated with the transportation agent, an identification code associated with the mobile platform, and the geographic location.

14. The method of claim 12
wherein supplying the transportation agent with the plurality of potential mobile platform selections includes supplying the mobile platform selections with corresponding destination parking locations, starting parking locations, and timing restraints; and,
wherein accepting the destination parking location includes accepting a mobile platform destination parking location selected by the transportation agent.

15. The method of claim 14 wherein the accepted destination parking location has a corresponding weighted value.

16. The method of claim 15 wherein supplying the plurality of mobile platform selections includes providing a mobile platform associated with a first entity; and,
the method further comprising:
an element selected from the group consisting of the first entity and the transportation agent receiving a reward corresponding to the value of the destination parking location.

17. The method of claim 12 wherein each mobile platform is associated with a corresponding entity; and,
the method further comprising:
the entity providing a reward responsive to factors selected from the group consisting of platform starting parking location, destination parking location, distance between starting and destination parking locations, timing restraints, travel time between starting and destination parking locations, time of day, day of the week, and combinations thereof.

18. The method of claim 12 wherein supplying the plurality of mobile platform selections includes providing a mobile platform with a publically accessible access point, selected from the group consisting of an IEEE 802.11 Wireless Local Area Network (WLAN) WiFi hotspot, an IEEE 802.11 Wireless Personal Area Network (WPAN) device, and combinations thereof.

19. The method of claim 12 wherein supplying the plurality of mobile platform selections includes providing a mobile platform with a selectively enabled media projection subsystem having an interface to project media.

20. The method of claim 12 wherein permitting the transportation agent to gain control over the selected mobile platform includes gaining control using an element selected from the group consisting of a user interface (UI) and an autonomous driving software application stored in a non-transitory memory enabling a sequence of processor executable steps for driving an automotive vehicle mobile platform.

21. A mobile communications system comprising:
a motion detection subsystem, configured for attachment to a mobile platform, to determine when the mobile platform is stationary;
a media projection subsystem, configured for attachment to the mobile platform, having an interface to project media;
a deployment subsystem, configured for attachment to the mobile platform, having an interface to supply an enablement signal with an identification code, in response to the mobile platform being stationary;
a communications subsystem, configured for attachment to the mobile platform, having an interface to receive verification information including the enablement signal and identification code, and an interface to transmit the verification information; and,
a reward subsystem providing a first reward to an entity associated with the mobile platform when the mobile platform is in motion and a second reward when the mobile platform is stationary.

22. The system of claim 21 further comprising:
a location subsystem, configured for attachment to the mobile platform, to determine a geographic location of the mobile platform; and,
wherein the communications subsystem transmits verification information including the geographic location.

23. The system of claim 21 further comprising:
a camera, configured for attachment to the platform, having an output to supply images of a proximate geographic location to the platform; and,
wherein the communications subsystem transmits the images to a server.

24. The system of claim 21 wherein the media projection subsystem is a selectively enabled media projection subsystem; and,
wherein the deployment system supplies an enablement signal in response to the media projection subsystem being enabled.

25. The system of claim 21 wherein the media projection subsystem projects media selected from the group consisting of a displayed image, broadcast sound, or a combination thereof.

26. The system of claim 21 further comprising:
a publically accessible access point, configured for attachment to the mobile platform, selected from the group consisting of an IEEE 802.11 Wireless Local Area Network (WLAN) WiFi hotspot, an IEEE 802.15 Wireless Personal Area Network (WPAN) device, and combinations thereof.

* * * * *